United States Patent
Mohler et al.

(10) Patent No.: US 9,341,456 B2
(45) Date of Patent: May 17, 2016

(54) SELF-PROPELLED PROJECTILE HAVING A FUEL-RICH PROPELLANT THAT REACTS WITH WATER

(71) Applicants: Jonathan Mohler, Vero Beach, FL (US); Timothy Mohler, Palm Beach Gardens, FL (US)

(72) Inventors: Jonathan Mohler, Vero Beach, FL (US); Timothy Mohler, Palm Beach Gardens, FL (US)

(73) Assignee: SPECTRE ENTERPRISES, INC., West Palm Beach, FL (US)

( * ) Notice: Subject to any disclaimer, the term of this patent is extended or adjusted under 35 U.S.C. 154(b) by 0 days.

(21) Appl. No.: 14/599,990

(22) Filed: Jan. 19, 2015

(65) Prior Publication Data

US 2016/0054109 A1    Feb. 25, 2016

Related U.S. Application Data

(60) Provisional application No. 61/929,969, filed on Jan. 21, 2014, provisional application No. 61/980,429, filed on Apr. 16, 2014.

(51) Int. Cl.
| | |
|---|---|
| *F42B 15/00* | (2006.01) |
| *F42B 15/10* | (2006.01) |
| *F42B 15/20* | (2006.01) |
| *F42B 19/26* | (2006.01) |
| *F42B 12/02* | (2006.01) |

(52) U.S. Cl.
CPC .................. *F42B 15/00* (2013.01); *F42B 12/02* (2013.01); *F42B 15/10* (2013.01); *F42B 15/20* (2013.01); *F42B 19/26* (2013.01)

(58) Field of Classification Search
CPC .......... F42B 15/00; F42B 15/10; F42B 15/20; F42B 15/22; F42B 17/00; F42B 19/00; F42B 19/12; F42B 19/26

USPC ......... 102/374, 380, 381, 399; 114/20.1, 20.2
See application file for complete search history.

(56) References Cited

U.S. PATENT DOCUMENTS

| | | | | |
|---|---|---|---|---|
| 2,509,710 | A * | 5/1950 | Van Loenen | F42B 12/44 102/364 |
| 3,181,937 | A * | 5/1965 | Cox | F02K 9/08 102/531 |
| 4,158,642 | A | 6/1979 | Langer, Jr. | |
| 5,052,272 | A * | 10/1991 | Lee | F41B 6/00 89/7 |
| 6,142,056 | A | 11/2000 | Taleyarkhan | |
| 7,059,250 | B1 * | 6/2006 | Sutherland | F42B 12/50 102/202.14 |
| 8,746,120 | B1 * | 6/2014 | Nolting | F41A 19/58 102/202 |
| 2014/0013982 | A1 * | 1/2014 | Meir | B01J 19/126 102/205 |

OTHER PUBLICATIONS

US Department of Energy, Reaction of Aluminum With Water to Produce Hydrogen, 2008.

(Continued)

*Primary Examiner* — James S Bergin
(74) *Attorney, Agent, or Firm* — William F. Lang, IV; Lang Patent Law LLC

(57) ABSTRACT

A system for initiating and controlling a reaction between a metal and water is provided for use in propelling a rocket, torpedo, or other munition. A thermite charge having a quantity of reducing metal in excess of that required to react with the metal oxide is utilized to melt and/or vaporize the excess reducing metal. Water may be added to the munition immediately before use, or in the case of a torpedo, may be taken in from the surrounding water. The principles embodied by Bernoulli's equation may be used to regulate the intake of water for the reaction with the reducing metal.

17 Claims, 4 Drawing Sheets

(56) References Cited

OTHER PUBLICATIONS

Louis Baker, Jr., and Louis C. Just, Studies of Metal Water Reactions at High Temperatures, III. Experimental and Theoretical Studies of the Zirconium-Water Reaction, 1962.

Jim Clark, Reactions of the Group 2 Elements With Water, 2002, http://www.chemguide.co.uk/inorganic/group2/reacth2o.html.

Venturi Effect, Wikipedia, http://en.wikipedia.org/wiki/Venturi_effect.

* cited by examiner

SELF-PROPELLED PROJECTILE HAVING A FUEL-RICH PROPELLANT THAT REACTS WITH WATER

CROSS REFERENCE TO RELATED APPLICATION

This application claims the benefit of U.S. provisional patent application Ser. No. 61/929,969, which was filed on Jan. 21, 2014, and entitled "Munition Having a Fuel or Payload that Reacts With Water." This application also claims the benefit of U.S. provisional patent application Ser. No. 61/980,429, which was filed on Apr. 16, 2014, and entitled "Munition Having a Fuel Rich Propellant that Reacts with Water."

TECHNICAL FIELD

The present invention relates to rocket and torpedo engines that utilize fuel that reacts with water to produce energy.

BACKGROUND INFORMATION

Energetic materials such as thermite are presently used when highly exothermic reactions are needed. Uses include cutting, welding, purification of metal ores, and enhancing the effects of high explosives. A thermite reaction occurs between a metal oxide and a reducing metal. Examples of metal oxides include $La_2O_3$, $AgO$, $ThO_2$, $SrO$, $ZrO_2$, $UO_2$, $BaO$, $CeO_2$, $B_2O_3$, $SiO_2$, $V_2O_5$, $Ta_2O_5$, $NiO$, $Ni_2O_3$, $Cr_2O_3$, $MoO_3$, $P_2O_5$, $SnO_2$, $WO_2$, $WO_3$, $Fe_3O_4$, $CoO$, $Co_3O_4$, $Sb_2O_3$, $PbO$, $Fe_2O_3$, $Bi_2O_3$, $MnO_2$, $Cu_2O$, and $CuO$. Example reducing metals include Al, Zr, Th, Ca, Mg, U, B, Ce, Be, Ti, Ta, Hf, and La. The reducing metal may also be in the form of an alloy or intermetallic compound of the above-listed metals.

Aluminum and other metals known to react with water in a highly exothermic reaction, although at room temperature the formation of aluminum oxide on the surface of the aluminum resists the reaction. Aluminum is therefore very safe to transport and store. It would therefore be desirable to have a way to utilize aluminum as a fuel, exposing the activated aluminum to water and initiating the reaction only at a desired time. Such a fuel system would be considerably safer than presently available fuel systems, and make possible the use of ambient oxidizers such as water and/or air.

Bernoulli equation is a well-known expression of the relationship between velocity and pressure for fluid flow. Bernoulli's equation is:

$$\text{pressure} + \frac{1}{2}(\text{density})(\text{flow velocity})^2 + (\text{density})(\text{acceleration of gravity})(\text{elevation height}) = \text{constant along a streamline}$$

Expressed differently:

$$(\text{static pressure}) + (\text{dynamic pressure}) + (\text{hydrostatic pressure}) = \text{constant along a streamline}$$

The present inventors are unaware of any present use of Bernoulli's principles as a fluid flow regulating mechanism for providing and regulating a flow of water to a reaction of a metal with water. Use of Bernoulli's equation as a regulating mechanism would take advantage of a simple principle of physics rather than more complex, space-occupying, and weight creating devices to provide a predetermined amount of water to a water-based reaction.

SUMMARY

The above needs are met by a self-propelled projectile having an engine portion containing a thermite charge having excess reducing metal, and a system for initiating the thermite charge. The munition further has a means for bringing water into contact with the excess reducing metal, whereby the thermite charge melts and/or vaporizes the excess reducing metal upon activation, and the melted or vaporized reducing metal reacts with water, thereby propelling the munition.

These and other features of the invention will become more apparent through the following description and drawings.

BRIEF DESCRIPTION OF THE DRAWINGS

Like reference characters denote like elements throughout the drawings.

DETAILED DESCRIPTION

Figure 1:
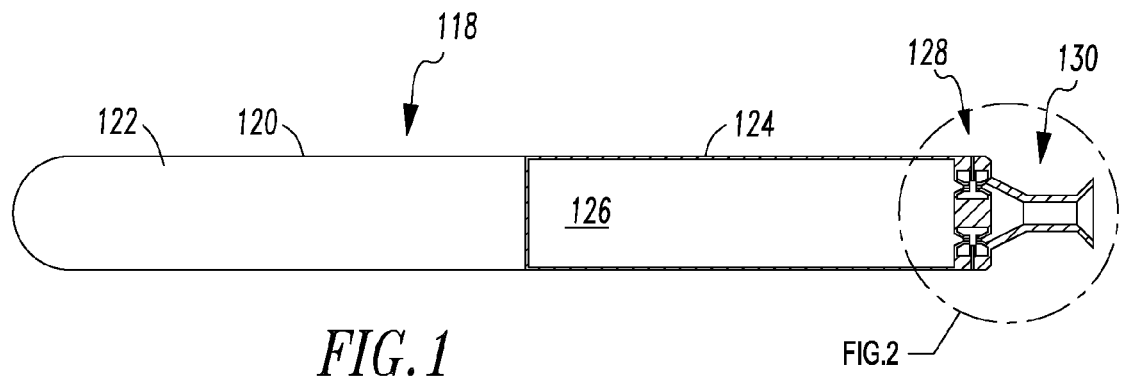
FIG. 1 is a cross sectional side view of a torpedo having a water breathing engine utilizing a thermite propellant.
Figure 2:
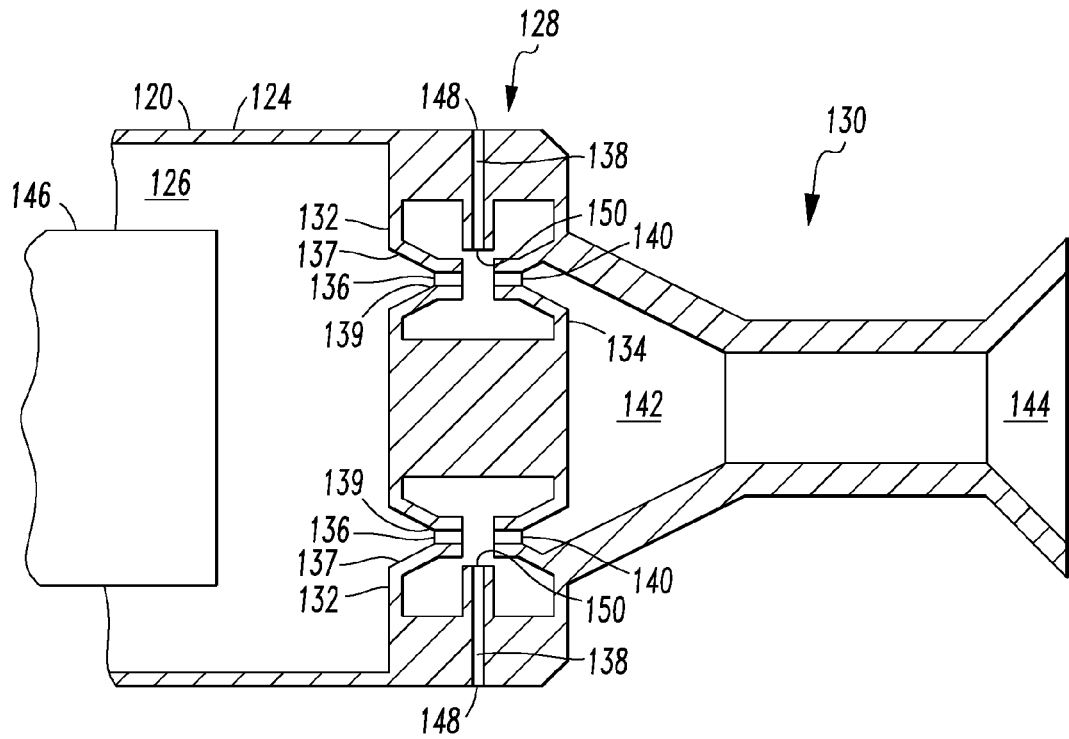
FIG. 2 is a cross sectional side view of a water intake, reaction chamber, and nozzle for a torpedo of FIG. 1.

The invention is described and illustrated herein with reference to a torpedo or rocket, but can be used with other munitions or self-propelled projectiles. Referring to the drawings, an example of a torpedo utilizing a water breathing engine is illustrated. FIG. 1 illustrates a torpedo 118 having a housing 120 with a forward payload portion 122 and rear engine portion 124. The rear engine portion 124 includes a propellant storage tank 126, a water aspiration and mixing chamber 128, and a nozzle 130 that is illustrated in more detail in FIG. 2.

The mixing chamber 128 includes a forward wall 132 and rear wall 134. A fuel inlet 136 is defined within the forward wall 132 for permitting fuel-rich exhaust to pass from the propellant tank 126 into the aspiration/mixing chamber 128. A water inlet 138 is defined within the housing 120 for permitting water from outside the torpedo 118 to enter the mixing chamber 128. An outlet 140 is defined within the rear wall 134 for permitting the fuel-rich exhaust/water mixture to exit the mixing chamber 128 and enter the nozzle 130 as they react with each other. The nozzle 130 defines a reaction chamber 142 and a nozzle opening 144 for channeling reaction products rearward of the torpedo 10.

In the example of a torpedo 118 illustrated in FIG. 1, the propellant 146 contained within the propellant storage tank 126 may be a thermite-based propellant 146 having excess reducing metal. The reducing metal is one which is known to react exothermically with water. One example of the thermite fuel component 146 is a combination of CuO and Al, and another example is a combination of $Fe_2O_3$ and Al, either of which will be supplied with excess Al as described in greater detail below. As another alternative, the combination of CuO and Mg may be used, with excess Mg being supplied. Additional alternative reducing metals include Boron and Zirconium. Any metal which can serve as a reducing metal for thermite and which reacts exothermically with water can be used, and can be supplied in a quantity exceeding that which is necessary to fully react with the metal oxide forming the other thermite component. The thermite fuel may take the form of pellets, rods, or any other conventional form. As another example, the thermite fuel may include metal oxide and reducing metal that have been hot pressed into a composite. As yet another alternative, some examples of the thermite-based fuel 146 may be prepared as an alternating sequence of layers of metal oxide and reducing metal.

The quantity of metal oxide 12 and reducing metal 14 are determined to ensure that the proportions of metal oxide and reducing metal will provide excess reducing metal, which will be melted or vaporized during the reaction. As one example, in the case of a metal oxide 12 in the form of CuO and reducing metal 14 in the form of Al, the chemical reaction is $3CuO+2Al \rightarrow 3Cu+Al_2O_3+heat$. The reaction therefore requires 3 moles of CuO, weighing 79.5454 grams/mole, for every 2 moles of Al, weighing 26.98154 grams/mole. CuO has a density of 6.315 g/cm$^3$, and aluminum has a density of 2.70 g/cm$^3$. Therefore, the volume of CuO required for every 3 moles is 37.788 cm$^3$. Similarly, the volume of Al required for every 2 moles is 19.986 cm$^3$. Because excess Al is desired, the amount of Al provided will exceed 2 moles of Al for every 3 moles of CuO. Some examples of the fuel will include about 23% to about 80.2% excess Al. Thus, for every 37.788 cm$^3$ of CuO, about 24.583 cm$^3$ to about 36.015 cm$^3$ Al will be provided. Expressed differently, the volume of Al provided for a given volume of CuO is about 65% to about 95% of the volume of CuO.

As another example, in the case of CuO and Mg, the chemical reaction is $CuO+Mg \rightarrow Cu+MgO+heat$. The reaction therefore requires one mole of CuO, weighing 79.5454 grams/mole, for every one mole of Mg, weighing 24.305 grams/mole. CuO has a density of 6.315 g/cm$^3$, and magnesium has a density of 1.74 g/cm$^3$. Therefore, the volume of CuO required for every mole is 12.596 cm$^3$. Similarly, the volume of Mg required for every mole is 13.968 cm$^3$. Therefore, to ensure complete consumption of each component, the mass of CuO will be about three times the mass of Mg, and the volume of CuO will be about the same as the volume of Mg. However, the goal is not to have complete consumption of the Mg, but to have excess Mg in order to react with water. Thus, the volume of Mg supplied will exceed the volume of CuO supplied.

If other metal oxides and reducing metals are selected, then the relative quantities of the metal oxide 12 and reducing metal 14 required for complete consumption of both can be determined by following the above examples, and then the amount of excess reducing metal needed for the subsequent reaction with water can also be similarly determined. Some examples of the thermite may also include an additional gas producing component. One example of a gas producing component is nitrocellulose. In some examples, the gas producing component may form about 2% to about 3% of the thermite propellant.

Aluminum typically does not react with water at room temperature due to the tendency of aluminum to rapidly form a layer of aluminum oxide on its surface when exposed to ambient oxygen. At elevated temperatures, particularly when aluminum is heated above its melting point, aluminum reacts much more readily with water. Thus liquid or vaporized Al will react with water. Three reactions are possible. The first is $2Al+6H_2O \rightarrow 2Al(OH)_3+3H_2$. The second is $2Al+4H_2O \rightarrow 2AlO(OH)+3H_2$. The third is $2Al+3H_2O \rightarrow Al_2O_3+3H_2$. All of these reactions are highly exothermic. When the excess aluminum within the fuel is heated to its melting or vaporization temperatures by a thermite reaction, subsequent reaction of the aluminum with water is likely to generate about 3,885 calories of energy for every 2 grams of aluminum.

Similarly, magnesium will typically not react with water at room temperature, but will react with water at elevated temperatures. The reaction is $Mg+H_2O \rightarrow MgO+H_2$. This reaction is also exothermic.

Referring back to FIGS. 1-2, the thermite fuel-rich propellant 146, which in the illustrated example is a high density composite, is ignited within the propellant tank 126. The excess reducing metal within the propellant 146 is melted and/or vaporized. The molten metal and/or metal vapor is pushed through a funnel or funnels 137 and then the inlet or inlets 136 by pressure within the tank 126 resulting from the thermite reaction as well as the vaporization of the reducing metal. Water is drawn into the aspiration/mixing chamber 128 through the inlets 138, causing the water to mix with the activated reducing metal. The mixture is directed outward by pressure from the propellant tank 126 as well as pressure within the aspiration/mixing chamber 128 caused by the commencing of the reaction of reducing metal with water, so that the mixture passes through the outlets 140 into the reaction chamber 142. Expressed differently, the pressure within the propellant tank is expected to be greater than the pressure within the aspiration/missing chamber, and the pressure within the aspiration/missing chamber is expected to be greater than the pressure within the nozzle, ensuring proper flow of fuel-rich exhaust through these components. The majority of the reaction of reducing metal with water is anticipated to take place within the reaction chamber 142. This reaction will generate pressure within the reaction chamber 142. Reaction products will exit the torpedo through the opening 144 in the nozzle 130, thereby relieving pressure from the reaction products in the rearward direction. Relief of rearward pressure provides forward thrust to the torpedo 128.

The fuel inlet 136 and water inlet 138 are structured to regulate the passage of fuel and water into the mixing chamber 128, so that fuel and water enter at the proper rate to produce the desired reaction. The inlet 138 and mixing chamber 128 are illustrated in greater detail in FIG. 3. In the illustrated example, the water inlet 138 is structured to utilize the principles embodied in Bernoulli's equation to take in an appropriate amount of water. The fuel inlet 136 is disposed at the narrow end 139 of the funnel 137. Thus, according to the well-known Venturi effect, fuel passing through the inlet 136 will travel faster than fuel that is just entering the funnel 137. Due to the increased speed of the fuel passing through the narrow inlet 136 as compared to fuel passing through larger portions of the funnel 137, the pressure at which fuel passes through the inlet 136 is lower than the pressure at the entrance to the funnel 137. This is because the relationship between the velocity of the fuel and pressure of the fuel is governed by Bernoulli's equation:

$$\text{inlet pressure} + \frac{1}{2}(\text{inlet density})(\text{inlet flow velocity})^2 +$$
$$(\text{inlet density})(\text{acceleration of gravity})(\text{elevation height}) =$$
$$\text{outlet pressure} + \frac{1}{2}(\text{outlet density})(\text{outlet flow velocity})^2 +$$
$$(\text{outlet density})(\text{acceleration of gravity})(\text{elevation height})$$

Because fuel flowing into the mixing chamber 128 will do so at a relatively high velocity and corresponding low pressure, the rate at which fuel enters the mixing chamber 128 will affect the rate at which water enters the mixing chamber 128. The entrance of water into the mixing chamber 128 is also controlled generally by Bernoulli's equation, but in a different manner. Water will enter the water inlet at a rate that is based on the difference between the pressure at the outside end 148 of the inlet 138 as compared to the pressure to which the inside end 150 of the inlet 138 is exposed, as well as the diameter of the inlet 138. The outside end 148 of the inlet 138 faces a direction that is generally perpendicular to the longitudinal axis of the torpedo 118, and will be exposed to water pressure and flow on the outside surface of the torpedo 118. Similarly, the inside end 150 of the inlet 138 will be exposed to the flow of aluminum liquid or vapor, as well as reaction products and any water that is already in the mixing chamber. Given the significantly larger mass of the torpedo compared to the mass of the reaction products, it is anticipated that the velocity of reaction products at the inside end 150 of the inlet 138 will be greater than the velocity of the torpedo with respect to the water as seen by the outside end 148 of the inlet 138. This difference in velocities will result in a difference in pressure at the inlet 148 and outlet 150 that is governed by Bernoulli's equation as set forth above.

Figure 3:
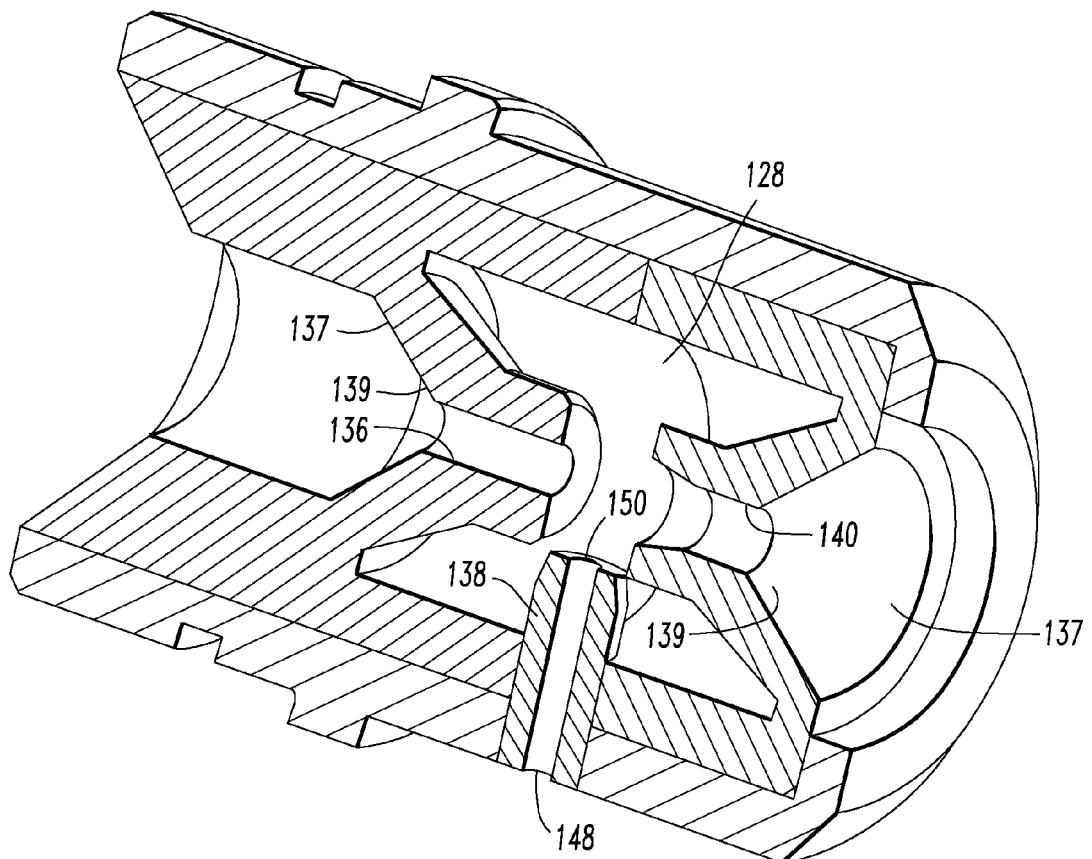
FIG. 3 is a perspective view of a mixing chamber for a torpedo of FIG. 1.

Turning to the individual components of Bernoulli's equation, acceleration of gravity and elevation height will both be equal at the inlet and outlet. The inlet will be exposed to a liquid (water), while the outlet will be exposed to a combination of liquid and gases. Thus, the inlet density will be greater than the outlet density. Because the flow velocity at the inside end 150 of the inlet 138 exceeds the flow velocity at the outside end 148 of the inlet 138, and because of the difference in densities at each end of the water inlet, pressure at the outside end 150 will be greater than pressure at the inside end 150, causing water to flow from outside the torpedo into the mixing chamber 128. Initial testing performed by the inventors using an aspiration/mixing chamber as shown in FIG. 3 indicates that at least a sufficient quantity of water will enter the inlet 138 in the case of a torpedo to properly drive the reaction with aluminum, without quenching the reaction.

Figure 4:
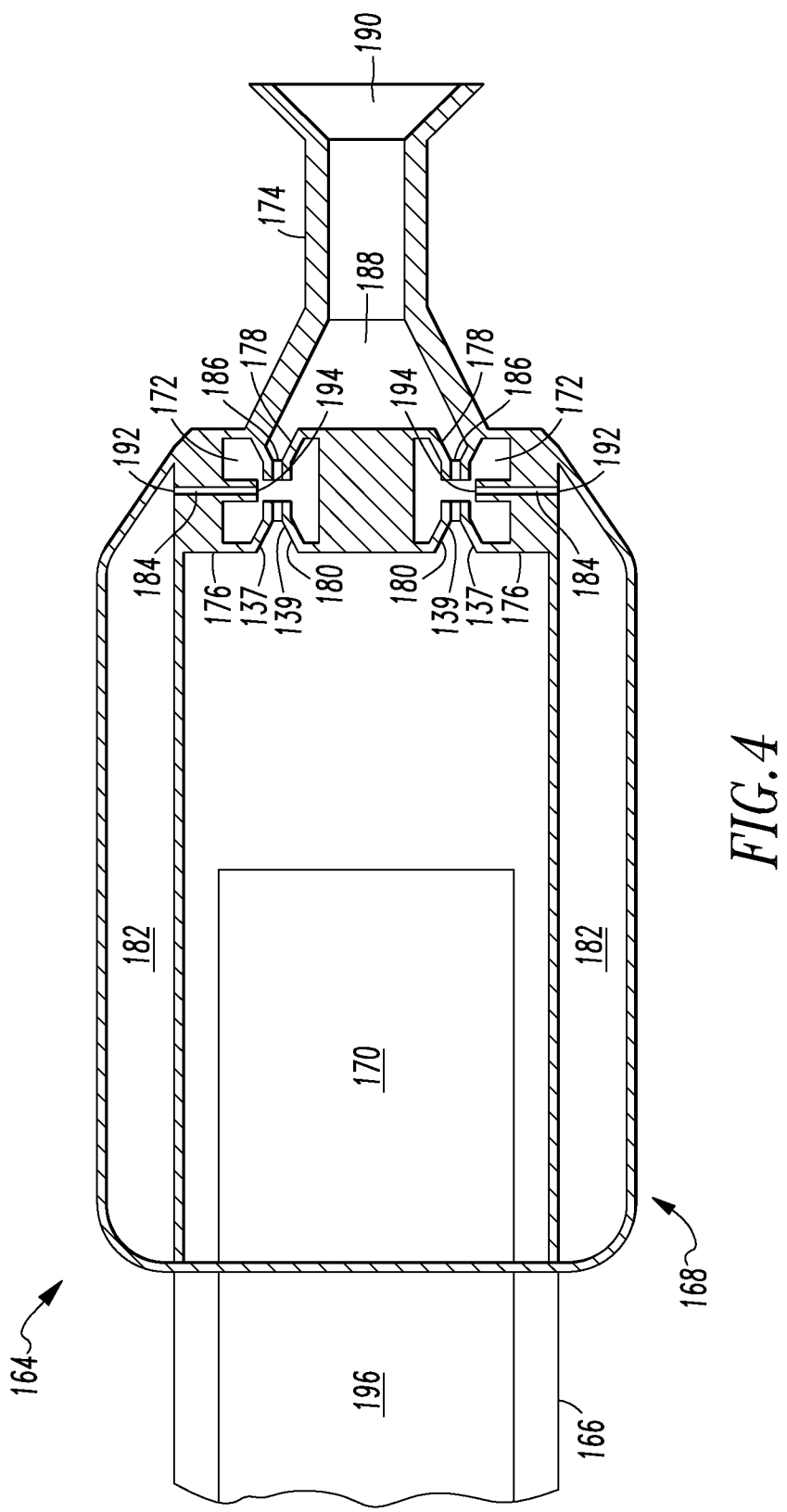
FIG. 4 is a cross sectional side view of a rocket having a water breathing engine.

FIG. 4 illustrates another example of a rocket 164 having a housing 166 with a forward payload portion and rear engine portion 168. The rear engine portion 168 includes a propellant storage tank 170, an aspiration/mixing chamber 172, and a nozzle 174. The aspiration/mixing chamber 172 includes a forward wall 176 and rear wall 178. A fuel inlet 180 is defined within the forward wall 176 for permitting fuel to pass from the fuel tank 170 into the mixing chamber 172. A water tank 182 is disposed adjacent to the mixing chamber 172, and in the illustrated example surrounds the mixing chamber 172. A water inlet 184 connects the water tank 182 with the mixing chamber 172. An outlet 186 is defined within the rear wall 178 for permitting the fuel/water mixture to exit the mixing chamber 172 and enter the nozzle 174 as they react with each other. The nozzle 174 defines a reaction chamber 188 and a nozzle opening 190 for channeling reaction products rearward of the rocket 164.

The rocket includes a water tank 170 for supplying water to the inlet 172. A thermite/gas production propellant having excess reducing metal such as Al is used to melt and/or vaporize the Al as described above, permitting the Al to react with water as water is drawn into the mixing chamber due to the pressure difference between the inlet 192 and outlet 194 of the water inlet 184 as well as the principles embodied in Bernoulli's equation as described above. The nozzle 174 is structured to direct the end products of the reaction outward, permitting pressure within the engine 166 to propel the rocket 164 forward.

The thermite propellant 196 includes excess reducing metal as described above. In the illustrated example the thermite propellant 192 is a high density composite. This propellant 196 is ignited within the propellant tank 170. The excess aluminum within the propellant 196 is melted and/or vaporized. The activated aluminum is pushed through the inlet or inlets 180 by pressure within the tank 170 resulting from the thermite reaction as well as the vaporization of the aluminum. Water is drawn into the aspiration/mixing chamber 172 through the inlets 184, causing the water to mix with the activated aluminum. The mixture is directed outward by reaction pressure from the propellant tank 170 as well as pressure within the aspiration/mixing chamber 172 caused by the commencing of the reaction of aluminum with water, so that the mixture passes through the outlets 186 into the reaction chamber 188. This reaction will generate pressure within the reaction chamber 188. Reaction products will exit the rocket through the opening 190 in the nozzle 174, thereby relieving pressure from the reaction products in the rearward direction. Relief of rearward pressure allows the forward pressure within the chamber 172 to provide forward thrust to the rocket 164.

Water flow into the mixing chamber 172 will be controlled by the pressure difference between the inlet 192 and outlet 194 of the water inlet 184 as well as the principles embodied in Bernoulli's equation as described above, with one difference. The velocity to which the end 192 of the water inlet 184 that communicates with the water tank 182 will see essentially zero velocity. Therefore, when Bernoulli's equation is applied as described above, the velocity seen by the end 194 of the water inlet 184 in communication with the mixing chamber 172 will necessarily be greater than the velocity seen at the end 192 of the water inlet 184, causing a pressure difference between the end 192 and end 194. Water will flow from the water tank 182 into the mixing chamber 172 as a result of this pressure difference.

Some examples of the rocket 164 may be transported and stored with the water tank 182 being empty. Water may be added to the water tank 182 when the rocket is being prepared for use.

Figure 5:
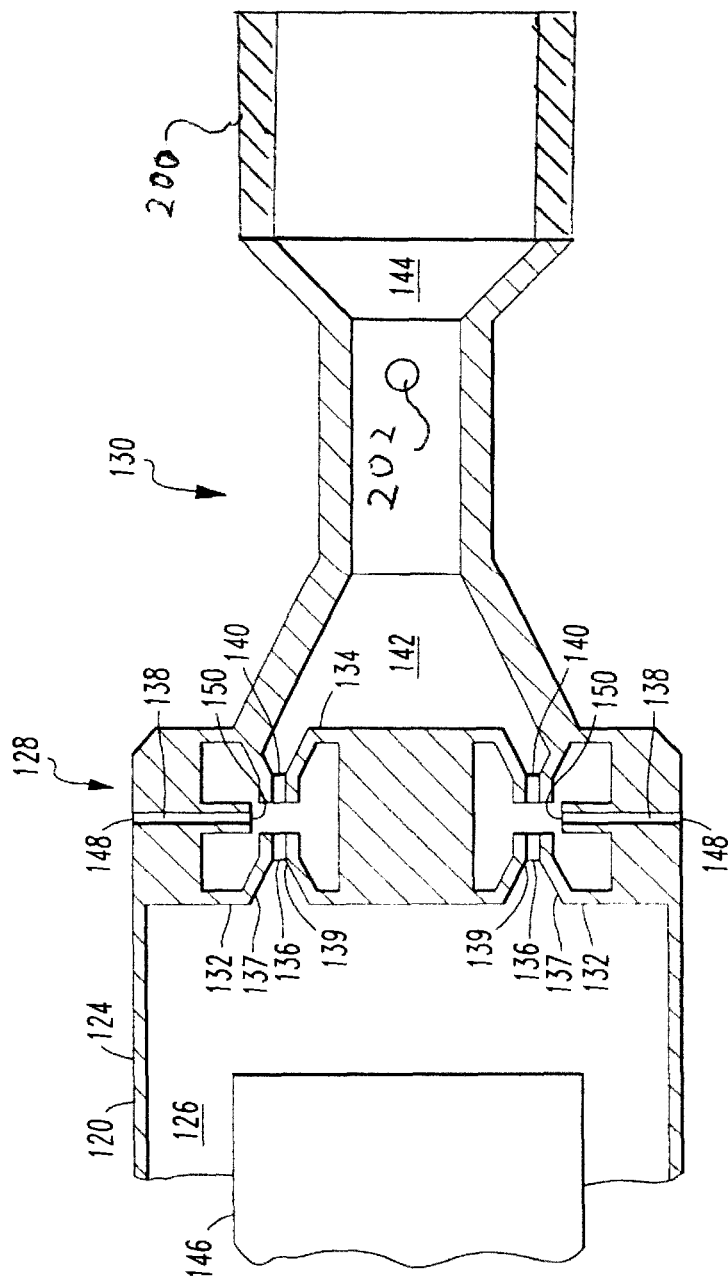
FIG. 5 is a cross sectional side view of another water intake, reaction chamber, and nozzle for a torpedo of FIG. 1 or rocket of FIG. 4, showing an afterburner.

Referring to FIG. 5, yet another example of a torpedo includes an air or oxygen supply system for supplying air or oxygen to the reaction chamber 142 (or reaction chamber 188) for use in an afterburner 200. Afterburners are well known in the art of propulsion. As explained above, the reaction of Al, Mg, or other reducing metals with $H_2O$ results in $H_2$ as one product of the reaction. This hydrogen can then be burned in an afterburner 200 to provide additional thrust to the torpedo. For torpedoes that travel along the surface of the water, or in the case of a rocket, a second air intake 202 may be used to direct air into a rear portion of the nozzle, where reaction products are likely to be present. In the case of a torpedo that travels underwater, a supply of air or oxygen may be connected to the air intake 202.

The present invention therefore provides a water breathing engine for a torpedo, rocket, or other munition having a propellant that is quite safe to transport and store, but produces a significant quantity of energy upon activation and combination with water. In the case of a torpedo, one component of the fuel, the water, is drawn from the surrounding environment during propulsion to the target. In the case of a rocket, one component of the fuel, the water, is kept separate from the Al until the rocket is ready to be launched. All components of the propellant remain completely safe when separated from each other.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A self-propelled projectile, comprising:
   an engine portion containing a thermite charge, the thermite charge having a quantity of metal oxide and a quantity of reducing metal, the quantity of reducing metal being in excess of a quantity of reducing metal that is necessary to react with substantially all of the metal oxide, and a system for initiating the thermite charge; and
   a means for bringing water into contact with the reducing metal;
   whereby the thermite charge melts or vaporizes the reducing metal upon activation, and the melted or vaporized reducing metal exothermically reacts with water, thereby propelling the self-propelled projectile.

2. The self-propelled projectile according to claim 1, wherein the means for bringing water into contact with the reducing metal include a mixing chamber that is in communication with water disposed outside of the self-propelled projectile.

3. The self-propelled projectile according to claim 2, wherein the mixing chamber includes a water inlet that is structured to supply a quantity of water to the mixing chamber, with the quantity of water being changed based on a velocity at which molten or vaporized reducing metal passes through the mixing chamber.

4. The self-propelled projectile according to claim 3, wherein the engine portion further comprises a propellant tank containing the metal oxide and reducing metal, and a fuel inlet structured to permit passage of molten or vaporized reducing metal from the propellant tank into the mixing chamber, the fuel inlet having a generally funnel-shaped entrance, whereby the velocity at which molten metal enters the fuel inlet is increased based on a Venturi effect.

5. The self-propelled projectile according to claim 4, wherein the reducing metal is selected from the group consisting of aluminum, magnesium, boron, and zirconium.

6. The self-propelled projectile according to claim 4, wherein the thermite charge includes a gas producing component.

7. The self-propelled projectile according to claim 6, wherein the gas producing component is nitrocellulose.

8. The self-propelled projectile according to claim 6, wherein the gas producing component forms about 2% to about 3% of the thermite charge.

9. The self-propelled projectile according to claim 1, further comprising a water tank disposed adjacent to the mixing chamber, the water tank being in communication with the mixing chamber.

10. The self-propelled projectile according to claim 9, wherein the mixing chamber includes a water inlet that is structured to supply a quantity of water to the mixing chamber based on a velocity at which molten or vaporized reducing metal passes through the mixing chamber.

11. The self-propelled projectile according to claim 10, wherein the engine portion further comprises a propellant tank containing the metal oxide and reducing metal, and a fuel inlet structured to permit passage of molten or vaporized reducing metal from the propellant tank into the mixing chamber, the fuel inlet having a generally funnel-shaped entrance, whereby the velocity at which molten metal enters the fuel inlet is increased based on a Venturi effect.

12. The self-propelled projectile according to claim 1, further comprising an afterburner that is structured to mix air or oxygen with hydrogen that is released by the reaction between the reducing metal and water, whereby the hydrogen is burned.

13. The self-propelled projectile according to claim 1, wherein the quantity of reducing metal exceeds the quantity of reducing metal that is necessary to react with substantially all of the metal oxide by about 23% to about 80.2%.

14. The self-propelled projectile according to claim 1, wherein the reducing metal is selected from the group consisting of aluminum, magnesium, boron, and zirconium.

15. The self-propelled projectile according to claim 1, wherein the thermite charge includes a gas producing component.

16. The self-propelled projectile according to claim 15, wherein the gas producing component is nitrocellulose.

17. The self-propelled projectile according to claim 15, wherein the gas producing component forms about 2% to about 3% of the thermite charge.

* * * * *